United States Patent Office

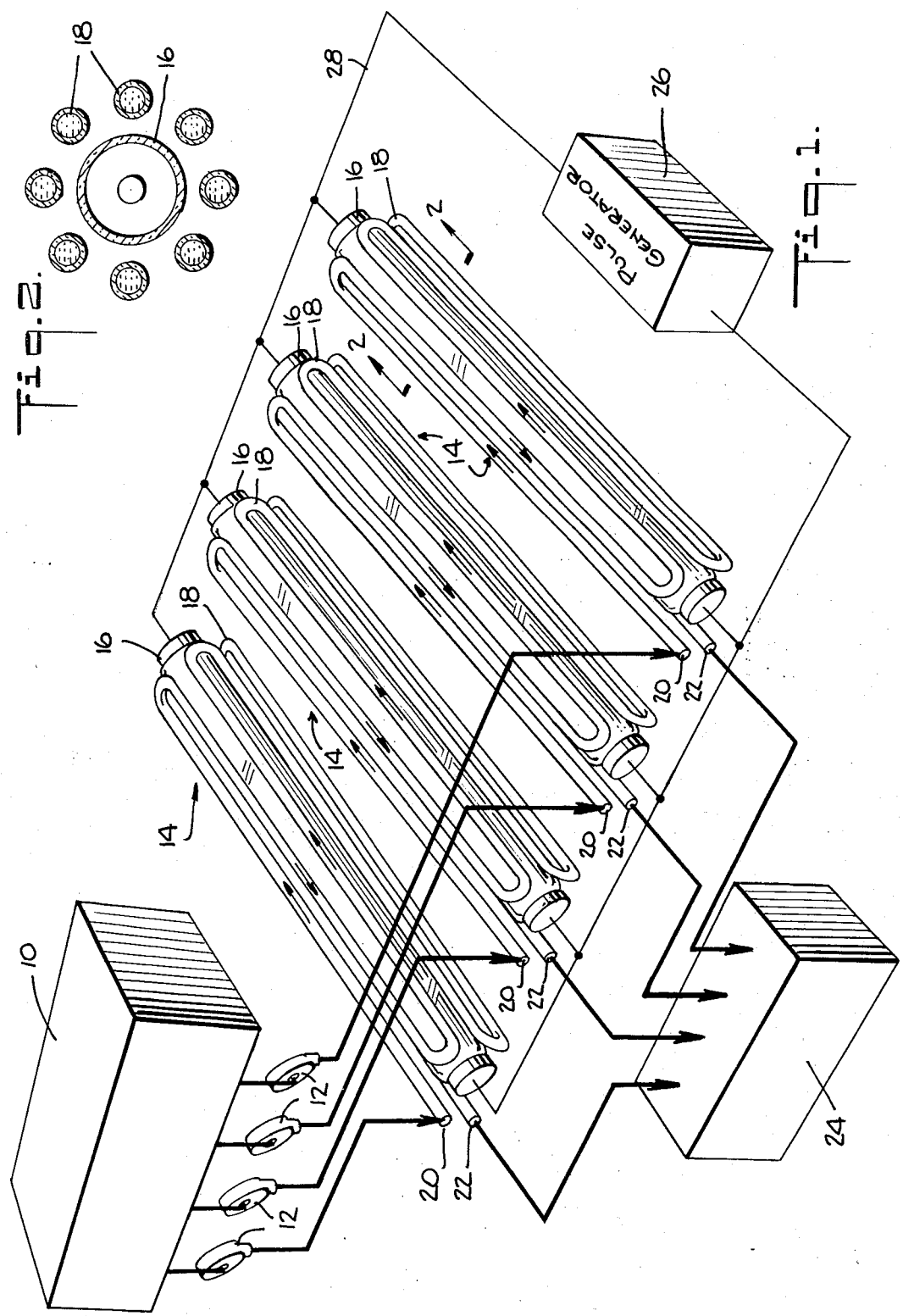

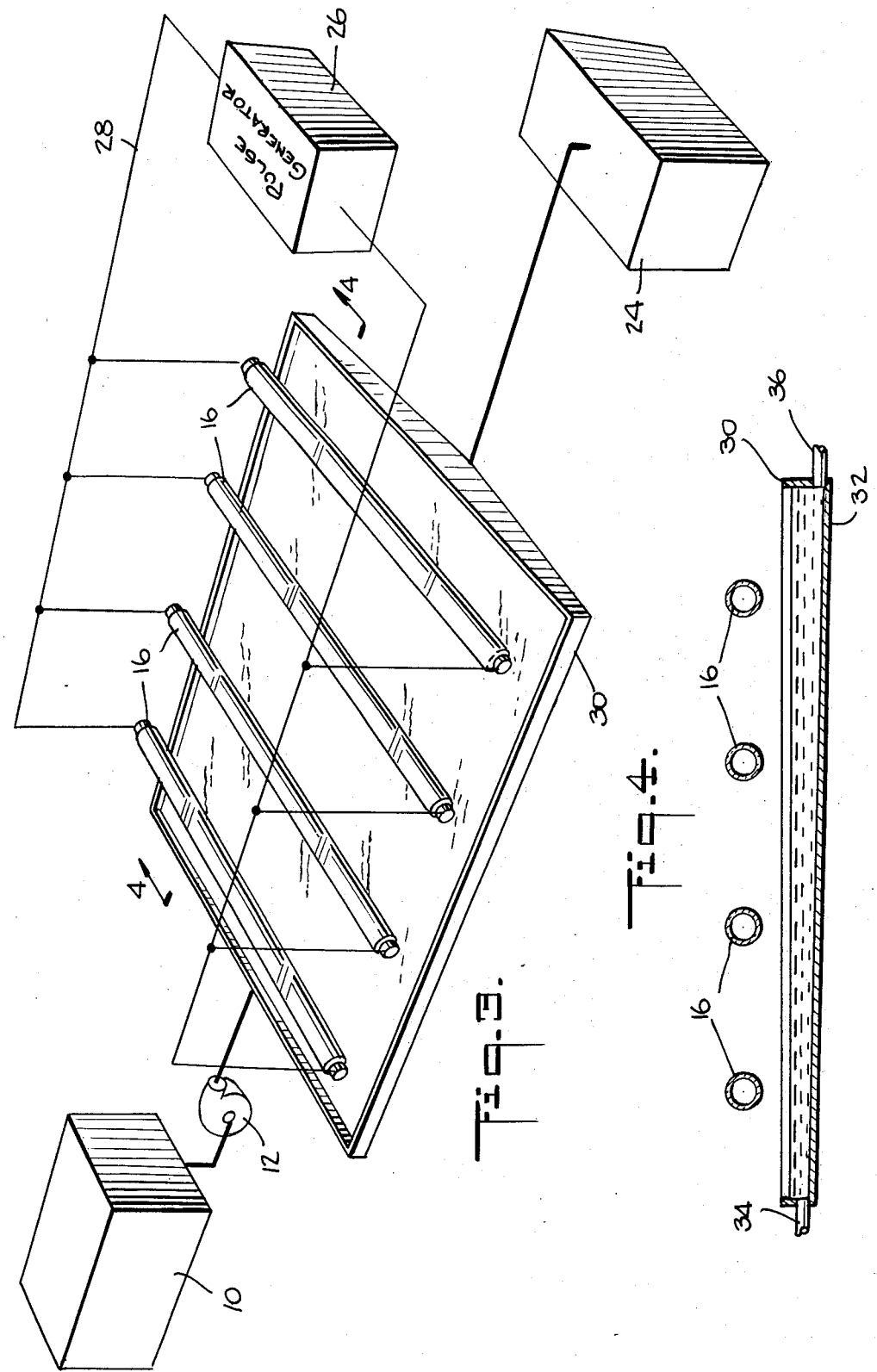

3,814,680
Patented June 4, 1974

3,814,680
PROCESS AND APPARATUS FOR PURIFICATION OF MATERIALS
M. Dale Wood, Hasbrouck Heights, N.J., assignor of a fractional part interest to Harold Meltzer, Jersey City, N.J.
Filed May 6, 1971, Ser. No. 140,919
Int. Cl. C02b 3/10
U.S. Cl. 210—64          7 Claims

ABSTRACT OF THE DISCLOSURE

Purification of materials such as liquids is accomplished by subjecting the material to ultraviolet radiation. The ultraviolet light source is operated at high frequency while maintaining the germicidal wavelength thereof.

BACKGROUND

This invention relates to ultraviolet light purification, and more specifically to a process and apparatus for purifying liquids wherein the efficiency and penetrating power of ultraviolet light is greatly increased by high operation and special wave-shaping of the power supply output.

Radiant energy in the ultraviolet region is well known to have a pronounced lethal effect on microorganisms. Accordingly, ultraviolet lamps have often been used to purify or sterilize gases and liquids. These lamps emit a high concentration of ultraviolet rays in the range of 2,500–2,700 angstroms, i.e., the range which exhibits germicidal qualities. Thus, germicidal lamps which emit ultraviolet radiations are in wide use to reduce the microbial population in, for example, hospital operating rooms and aseptic filling rooms in the pharmaceutical industry where sterile products are being pipetted into vials or ampules, and in the food and dairy industry for treatment of contaminated surfaces.

Heretofore, the use of ultraviolet light for germicidal purposes has been severely limited since ultraviolet rays have very little ability to penetrate matter. Even a thin layer of glass filters off a large percentage of the rays. With respect to the sterilization of liquids, color, turbidity, minerals and dirt seriously impair, and in high concentrations completely block any ultraviolet ray penetration.

Of late, the effect of pollution by city sewerage systems has been highly publicized. Although many sophisticated systems for disposing of sewage have been proposed, most are impractical or so complex as to be of prohibitive cost. Since sewage is a variable mixture of substances from many sources, it is to be expected that its microbial flora will flourish in both types and numbers. Raw sewage may contain millions of bacteria per milliliter, and is a potential source of pathogenic intestinal organisms. The poliomyelitis virus has been demonstrated to occur in sewage, and the bacterial viruses are readily isolated from the same source.

In view of the potential health hazard associated with the disposal of sewage, it is necessary to provide for adequate sterilization thereof. Heretofore, some attempts have been made to sterilize sewage by means of ultraviolet light. As one example, U.S. Pat. No. 3,182,293 describes a system wherein liquid is passed in intimate contact over ultraviolet lamps. The effectiveness of this system is low because the liquid to be sterilized must be in contact with the ultraviolet lamp so that the germicidal rays may penetrate same. Since the liquid contacts the lamp, it readily becomes dirty thereby necessitating continuous cleaning. Moreover, complicated monitoring and safety devices are necessary to ensure proper operation of the system. In additional systems, the liquid to be purified is atomized or subjected to a spraying action to compensate for the ineffective penetration of the ultraviolet rays such as is disclosed in U.S. Pat. No. 2,485,267. It will be appreciated that the equipment for accomplishing atomization is bulky and expensive. Moreover, these processes cannot accomplish 100% kill of the microorganism population.

An additional factor which has heretofore severely limited the use of ultraviolet light purification for sewage is the fact that large cities must dispose of millions of gallons of sewage in a single day. This would require the use of a multitude of ultraviolet lamps, and to operate all the lamps would require extremely large transformer and generator units.

The purification of drinking water is also of great importance. Heretofore, municipal water supplies were purified by filtering and the addition of chlorine, or the like. Although chlorine is suitable for disinfecting large quantities of water, it tends to impart undesirable tastes to the water and is not in all cases totally effective. In instances where the water supply has a large microbial population, the degree of chlorination necessary for reducing the population to tolerable levels renders the water almost unpalletable.

Accordingly, the principal object of this invention is to provide an apparatus and process for the elimination of deleterious microorganisms from fluids and other materials in a facile and economical manner.

SUMMARY

In accomplishing the above object, I have found that ultraviolet lamps operated at high frequency exhibit unexpected and greatly improved efficiency and penetration. Heretofore, ultraviolet lamps have been operated from 50 or 60 Hz. power sources. While the germicidal wavelength of the ultraviolet light is obtained at these frequencies, the transmissability thereof through gases and liquids is seriously impaired. It has been discovered that an ultraviolet lamp run from a high frequency power source such as in the magnitude of 5 kHz. has unexpected transmissability and kill power.

The power source design features wave-shaping to provide square wave output for improved operation of the power transistors and for more effective ultraviolet radiation. Additionally, high frequency operation affords the advantages of a smaller power supply and improved efficiency, i.e., the capability of operating a multitude of ultraviolet lamps with a small power supply. Moreover, the power supply unit of this invention affords AC or DC operation at any voltage and eliminates the problem of over-heating.

In accordance with one embodiment of the invention, there is provided apparatus for affording maximum exposure and penetration for the ultraviolet light. In brief, the fluid to be purified is passed through transparent tubing arranged around a single ultraviolet lamp. The tubing is situated so that the longitudinal axis thereof is parallel to the longitudinal axis of the lamp, and a plurality of interconnected tubes may be mounted circumferentially around the lamp. Thus, the fluid to be purified passes along the longitudinal axis of the lamp a number of times before being exited. In such manner, substantial quantities of fluid may be passed in close proximity to a single lamp at increased volume while maintaining the kill rate of the microorganisms therein.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for the purpose of illustration and description; and are shown in the accompanying drawings forming a part of the description wherein:

FIG. 1 is a diagram partially in schematic illustrating one embodiment of the invention;

FIG. 2 is a cross-section of a single unit taken along line 2—2 of FIG. 1;

FIG. 3 is a diagram partially in schematic showing a second embodiment of the invention; and FIG. 4 is a cross-section view taken along line 4—4 of FIG. 3.

DESCRIPTION

With reference to FIG. 1, the fluid to be purified may be collected in collection tank 10. The fluid is then pumped by pumps 12 through separate conduits to individual purification units generally indicated by the numeral 14.

Each purification unit comprises an ultraviolet lamp 16 and transparent tubing 18. The tubing 18 may be a continuous tube which has been formed as a plurality of lengths parallel to the longitudinal axis of the lamp 16 and spaced annularly thereabout (see also FIG. 2). It is preferred that the tubing be constructed of quartz since this material does not, to a significant extent, hamper the transmission therethrough of the ultraviolet rays. However, since quartz is not readily bent in the desired proportions, I prefer to use individual quartz tubes, interconnected by U-joints to form the desired arrangement.

The fluid is pumped to the separate entrances 20 of the tubing at each unit and flows therethrough in the direction indicated by the arrows. Thus, the fluid must travel longitudinally along the axis of the lamps 16 numerous times before exiting at 22. Moreover, this arrangement prevents laminar flow conditions in addition to reducing the water wall, i.e., the maximum distance between the ultraviolet light source and furthest bacteria in the fluid. In such manner, the fluid is subjected to the maximum concentration of ultraviolet rays during its course through the tubing.

After exiting the tubing, the fluid may then be collected in tank 24 prior to distribution in any well known manner.

The ultraviolet lamps 16 may be standard lamps which are readily available on the market. Although in the figure, only four lamp units are illustrated, it should be understood that with the power supply as hereinafter described, there may be as many lamp units as is necessary for output requirements.

The lamps 16 are driven by a high frequency power supply 26 and are connected in parallel thereto. The high frequency power supply may be, for example, a 5 kHz. pulse generator. The pulse generator may include any known means of providing a 5 kHz. square wave pulse, i.e., a 5 kHz. driver, driven by a suitable pulse generator.

It has been found that in driving the ultraviolet lamps 16 at high frequency such as 5 kHz. provides the surprising result of greatly enhanced penetration and kill power of the ultraviolet radiation. In addition, by driving the lamps 16 by a high frequency generator, it is possible to run a multitude of lamps by one relatively small unit. For example, one 5 kHz. pulse generator may drive well over one hundred ultraviolet lamps, whereas to power a like number of lamps by a standard 60 Hz. power supply would require an extremely large power supply with the incident heating problems, etc.

Although the aforementioned power supply has been described as a 5 kHz. pulse generator, it is to be understood the present invention contemplates any high frequency driver. It has been found that frequencies ranging from 1 kHz. to 20 kHz. impart the desired qualities to the ultraviolet radiation. However, it is preferred to utilize a power supply of about 5 kHz.

The embodiment of the present invention, as illustrated in FIGS. 1 and 2, is particularly suited for the purification of water supplies. However, for the purification of sewage effluents, the above embodiment is not particularly suitable, due to the fact that the fluid is relatively dirty and may readily coat the inside of the tubing with dirt which impairs the transmissability of ultraviolet light therethrough. Thus, frequent cleaning would be necessary.

The embodiment as depicted in FIGS. 3 and 4 is more suited for the purification of sewerage. As shown in FIG. 3, the sewage effluent may be collected in tank 10 and thereafter pumped by means of pump 12 to a pan 30. The effluent is channeled into pan 30 in such manner as to provide an even layer of the fluid over the base of the pan. Suspended over pan 30 is a battery of ultraviolet lamps 16 arranged along the flow path of the effluent. The lamps may be suspended in any known fashion; however, the proximity thereof to the fluid in pan should be as close as possible in order to afford maximum exposure. The lamps 16 are connected in parallel to a suitable high frequency power source 26 such as a 5 kHz. pulse generator.

After flowing through pan 30, the sterilized fluid is collected in tank 24. In the sewage treatment industry, tank 24 may be a settling tank.

In order to insure a good flow rate and maximum exposure, the pan 30 may have an inclined base 32, as is shown in FIG. 4. With this construction, the fluid depth is less at the inlet end and increases towards the outlet end. Thus, during the initial stage of exposure, and when the microbial population is greatest, the depth of fluid is minimal to afford maximum exposure.

For sewage treatment plants, the above embodiment may be constructed as a plurality of pans mounted horizontally with the ultraviolet lamps interposed therebetween. In addition, the pan bases 32 may be constructed of glass or any other ultraviolet light transmitting material so as to afford exposure from both top and bottom. With the power supply of the present invention, this construction may be readily adapted to large plants since the power supply is small. Heretofore, such construction using a great many lamps was infeasible due to the fact that 60 Hz. power for a multitude of lamps would require an extremely large power supply.

The present invention will be further illustrated by the following examples:

Example I

In this example, concentrations of *Escherichia coli* (ATCC 7011) are exposed to ultraviolet light driven at standard frequency and at high frequency for various exposure times. *Escherichia coli* is chosen as a test microorganism since it is a normal inhabitant of the intestinal tract of man and other animals and the presence thereof in water is indicative of fecal pollution.

The microorganism is tested in concentrations of 2,000,000 per ml. of water and the bacteriocidal effect thereon by the ultraviolet light is determined by a standard and well known manner. Briefly stated, samples of the microorganism are exposed to ultraviolet rays from a standard ultraviolet lamp driven at high frequency. Control samples are also exposed to the rays of an ultraviolet lamp driven by a standard 60 Hz. power source. The exposure times are varied and after exposure, a standard bacteria count is made on the exposed concentrations to determine the percentage of kill. The results are given in the following Table I:

TABLE I

| Exposure time | 60 Hz. | 5 kHz. | 8 kHz. | 10 kHz. | 15 kHz. | 20 kHz. |
|---|---|---|---|---|---|---|
| 30 sec., percent | 74.0 | 99.7 | -------- | 85.0 | 88.0 | 87.0 |
| 1 min., percent | 86.0 | 99.9 | 95.0 | 98.0 | 99.0 | 98.0 |
| 3 min., percent | 96.0 | 100.0 | -------- | | | |

Example II

In this example, concentrations of *Escherichia coli* are tested in the same manner as in Example I. However, in this example, the fluid concentrations are tested in a labyrinth exposure unit of the embodiment of the invention as depicted in FIGS. 1 and 2. The results of this example are given in the following Table II:

TABLE II

| Exposure | 60 Hz. | 5 kHz. |
|---|---|---|
| 30 sec., percent | 80 | 100 |
| 1 min., percent | 96 | 100 |

As is evident from the above examples, it is possible to achieve a 100% kill in relatively short exposure periods with the present invention which has heretofore not been achieved. Consequently, the process and apparatus of this invention may be readily used as a means for purifying large quantities of fluids which has heretofore been unattainable.

What is claimed is:

1. A process for purifying material which comprises the steps of:
   passing said material in proximity to at least one standard 60 Hz. ultraviolet lamp;
   energizing and driving said lamp with an alternating power source having a frequency of from 1 kHz. to 20 kHz.; and
   irradiating said material with the ultraviolet rays from said lamp to impart a bactericidal effect thereto.

2. A process according to claim 1 wherein said standard ultraviolet lamp is energized and driven by an alternating power source having a frequency of 5 kHz.

3. Apparatus for purifying fluids having a bacterial population therein which comprises:
   at least one standard 60 Hz. ultraviolet lamp;
   means for continuously supplying said fluid in proximity to said ultraviolet lamp;
   power supply means adapted to energize and drive said ultraviolet lamp, said power supply means having a frequency of from 1 kHz. to 20 kHz.; and
   means for continuously removing said fluid from proximity to said lamp after said fluid has been subjected to the bactericidal effect from the ultraviolet rays from said lamp.

4. Apparatus according to claim 3 wherein said power supply means is a 5 kHz. pulse generator.

5. Apparatus for purifying fluids having a bacterial population therein which comprises:
   at least one standard 60 Hz. ultraviolet lamp;
   power supply means adapted to energize and drive said ultraviolet lamp, said power supply means having a frequency of from 1 kHz. to 20 kHz.;
   a plurality of interconnected ultraviolet transmitting tubes arranged circumferentially around said lamp with the longitudinal axis of each tube being parallel to the longitudinal axis of said lamp;
   means for supplying said fluid to one of said tubes whereby said fluid enters one tube and flows along the length thereof and thereafter flows in opposite directions in succeeding tubes; and
   means for removing said fluid from one of said tubes.

6. Apparatus according to claim 5 wherein said power supply means is a 5 kHz. pulse generator.

7. Apparatus according to claim 5 wherein said tubes are quartz.

References Cited

UNITED STATES PATENTS

| 1,278,278 | 9/1918 | Wood | 99—218 |
| 3,509,999 | 5/1970 | Reid et al. | 21—54 R X |
| 1,788,906 | 1/1931 | Brown | 21—54 R |
| 3,672,823 | 6/1972 | Boucher | 21—54 A X |

FOREIGN PATENTS

| 331,026 | 4/1929 | Great Britain | 99—218 |

FRANK A. SPEAR, JR., Primary Examiner

F. LANDER, Assistant Examiner

U.S. Cl. X.R.

21—54 R; 426—241